Figure 1:
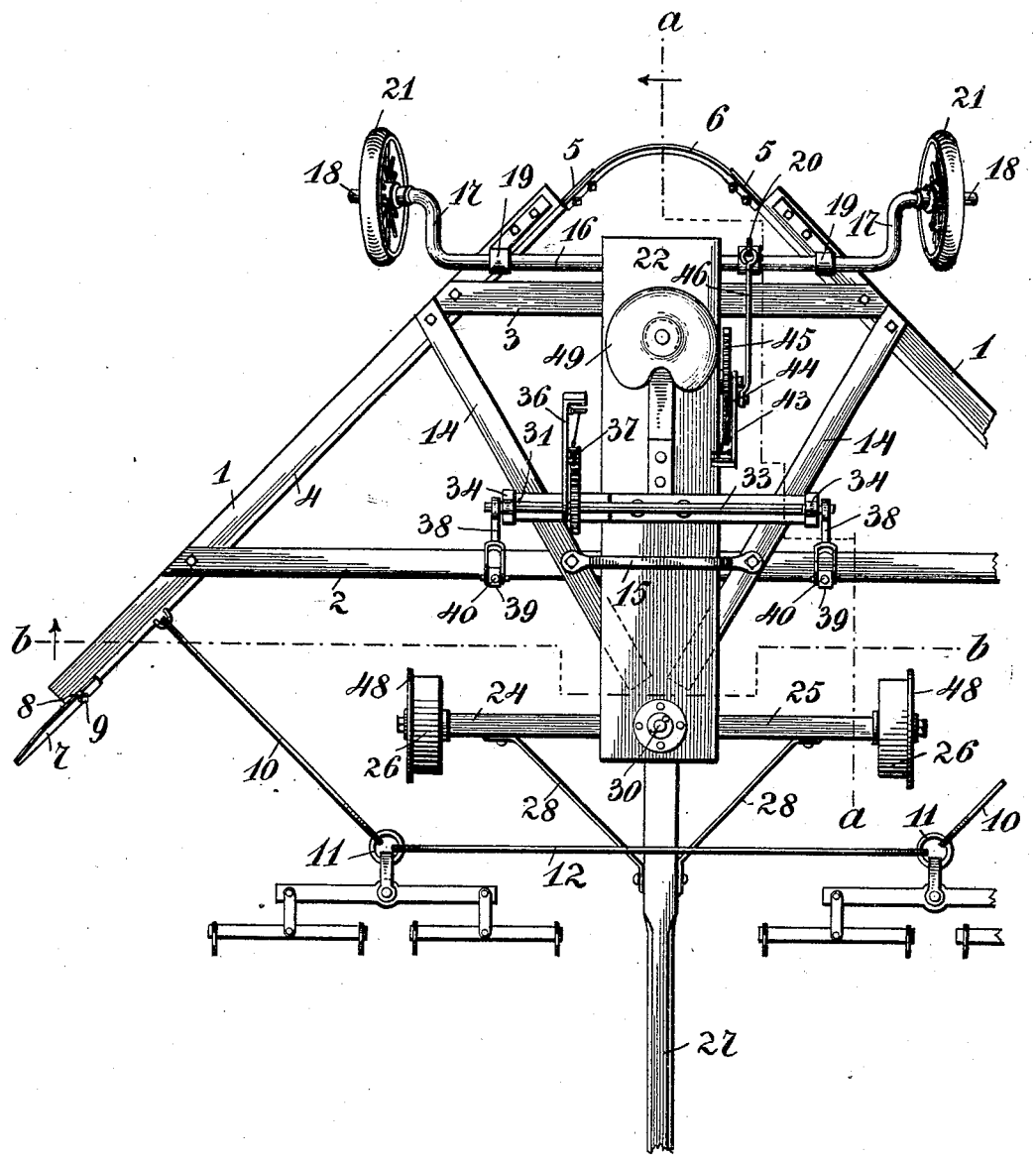

No. 791,937. PATENTED JUNE 6, 1905.
I. F. NOBLE.
ROAD MACHINE.
APPLICATION FILED JULY 11, 1904.

2 SHEETS—SHEET 1.

Witnesses
C. Munter
C. H. Gresbauer

Inventor
Ira F. Noble
by H. B. Wilson
Attorney

No. 791,937. PATENTED JUNE 6, 1905.
I. F. NOBLE.
ROAD MACHINE.
APPLICATION FILED JULY 11, 1904.
2 SHEETS—SHEET 2.
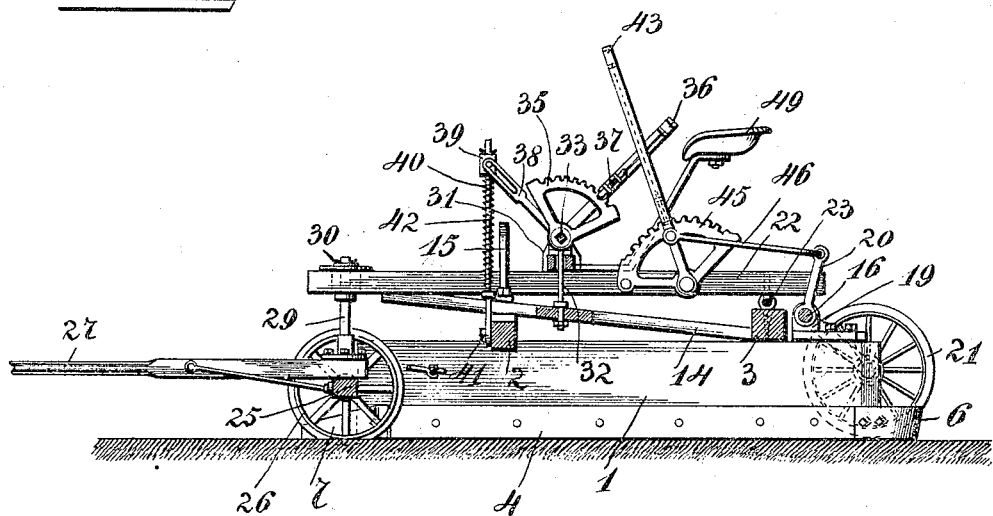
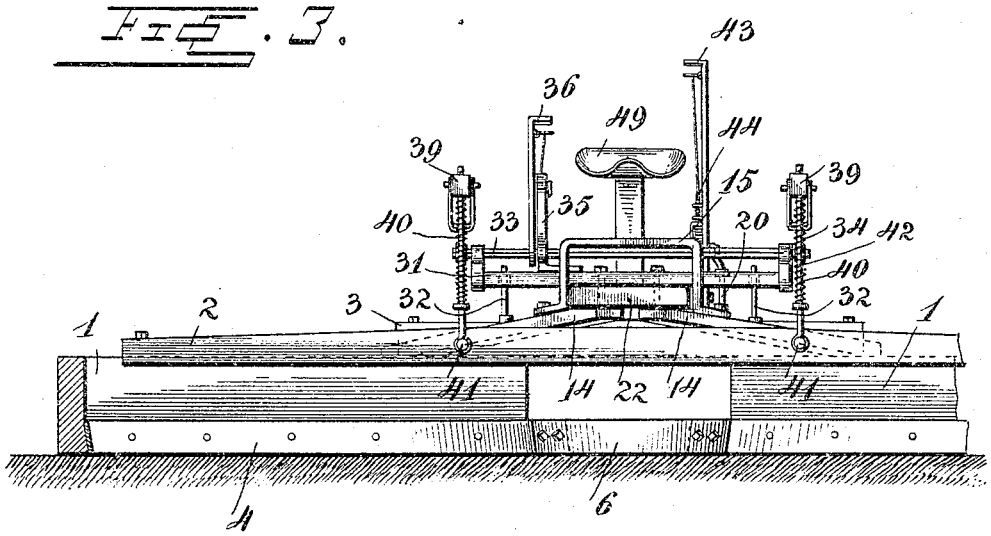
Witnesses
C. Munter
G. H. Greesbauer
Inventor
Ira F. Noble
by H. B. Wilson
Attorney No. 791,937. Patented June 6, 1905.

UNITED STATES PATENT OFFICE.

IRA F. NOBLE, OF GRAETTINGER, IOWA.

ROAD-MACHINE.

SPECIFICATION forming part of Letters Patent No. 791,937, dated June 6, 1905.

Application filed July 11, 1904. Serial No. 216,111.

*To all whom it may concern:*

Be it known that I, IRA F. NOBLE, a citizen of the United States, residing at Graettinger, in the county of Palo Alto and State of Iowa, have invented certain new and useful Improvements in Road-Machines; and I do declare the following to be a full, clear, and exact description of the invention, such as will enable others skilled in the art to which it appertains to make and use the same.

This invention relates to improvements in road-machines, and particularly to road scrapers and levelers; and it consists in the construction, combination, and arrangement of devices hereinafter described and claimed.

The object of my invention is to provide a machine of this character which is simple in construction, efficient in use, and which may be manufactured at comparatively slight cost.

In the accompanying drawings, Figure 1 is a top plan view of a road leveler and scraper embodying my improvements. Fig. 2 is a longitudinal sectional view taken on the plane indicated by the line *a a* of Fig. 1; and Fig. 3 is a transverse sectional view of the same, taken on the plane indicated by the line *b b* of Fig. 1.

In the embodiment of my invention I provide a scraper which has a pair of rearwardly-converging side bars 1, which are connected together at a suitable distance from their front ends by a cross-beam 2. A cross-bar 3 also connects the said side bars together and is secured on the upper sides thereof near their rear ends. The rear ends of the said side bars are spaced apart, as shown in Fig. 1. On the front sides of the said side bars, at the lower portions thereof, are secured scraper-blades 4 of suitable width and thickness. The rear ends of the said scraper-blades project beyond the rear end of the side bars, as at 5, and are connected to the ends of a curved or arc-shaped leveling-blade 6, which is placed in the space between the rear converging ends of the side bars.

In the operation of the machine the blades 4 scrape and convey the earth from the sides to the center of the road, where it is leveled off by the blade 6. It will be observed that the height of the plate 6 is less than that of the bar 1, so that the excess of material may readily pass over said plate 6.

The scraper-blades may be lengthened to suit different widths of road-surfaces by the use of extension-blades 7, which are adapted to be applied to the forward ends thereof. Said blades 7 are provided at their rear ends with slots 8 for the passage of bolts 9, whereby they may be securely attached to the forward ends of the blades 4 and adjusted to suit varying conditions.

To the side bars of the scraper are attached forwardly and rearwardly extending draft-rods 10, which are connected at their inner ends, by means of links 11, to the ends of a central draft-rod 12. At the points where the rods 10 are connected to the links 11 are attached doubletrees or other suitable draft devices.

Brace-bars 14, which are diagonally disposed and converge forwardly, have their rear ends bolted on the upper sides of the side bars 1 at or near the ends of the cross-bar 3 and have their front ends bolted on the cross-beam 2 and spaced apart, as shown. An inverted-U-shaped guide-yoke 15 has the lower ends of its vertical side arms or standards bolted on the front ends of the said brace-rods 14 or otherwise secured on the machine. An axle 16, the ends of which are provided with cranks 17, having inclined spindles 18, is mounted in bearings 19, which are secured on the side bars 1 at or near the rear ends thereof. Said cranked axle is provided with an arm 20, which extends radially therefrom, and on the inclined spindles of the said cranked axle are mounted a pair of outwardly-inclined rear supporting-wheels 21.

In connection with the scraper I provide a wheeled frame, which I will now describe.

A longitudinally-disposed footboard 22 has its rear end pivoted or hinged to the center of the rear cross-bar 3 by means of eyebolts 23 or other suitable devices, so that the front portion of the said footboard may be moved vertically. The front portion of the footboard projects through and is guided between the vertical standards or side arms of the yoke 15. A front truck 24, which is here shown as comprising an axle 25, front supporting-wheels 26, a tongue or draft-pole 27, and braces 28, is pivotally connected to the front end of the footboard, said pivotal connection being here shown as an arm 29, which extends upwardly from the rear end of the tongue and has its upper end, which is cylindrical in shape, pivotally mounted in a bearing 30 in the center of the front end of the footboard. A bar 31 is disposed transversely of the footboard at a point about midway between its ends and is bolted or otherwise secured thereto. The said bar is connected to the brace-bars 14 for vertical movement independently thereof by means of bolts 32. The openings in the said bar through which the said bolts extend are sufficiently large to enable the said bar to play freely on the said bolts.

A rock-shaft 33 is journaled in bearings 34, which are secured on the cross-bar 31. One of the said bearings has a segment-rack 35, and the said rock-shaft has a lever-arm 36, which projects radially therefrom and is provided with a spring-pressed locking-dog 37 of the usual construction, which coacts with the segment to lock the rock-shaft at any desired adjustment. Said rock-shaft is provided with radial arms 38 at its ends, which are disposed at substantially right angles with reference to the lever-arm 36 and which have their front or outer ends bifurcated, as shown. Between the bifurcated ends of the said arms 38 are pivotally mounted guide-blocks 39, which are movable vertically on a pair of vertically-disposed guide-rods 40, the lower ends of which are provided with eyes, through which extend bolts 41, which secure said guide-rods to the front side of the cross-beam 2. On the guide-rods 40 are coiled extensile springs 42, the lower ends of which are secured against vertical movement and the upper ends of which bear under the guide-blocks 39, the function of the said springs, in connection with the guide-rods and the rock-shaft 33, with its arms 38, being to press downwardly on the cross-beam 2. Since the rock-shaft 33 is carried by the vertically-movable footboard 22, it will be understood that the downward thrust of the springs 42 on the cross-bar 2 tends to raise the front end of the scraper, so as to impose the weight thereof on the front truck. It will be understood that by appropriately turning and securing the shaft 33 the front end of the scraper may be entirely raised from the ground.

The hand-lever 43 is pivotally connected at its lower end to the footboard at a suitable distance from the rear end of the latter and is provided with a spring-pressed locking-dog 44 of the usual construction, which coacts with a segment 45 to lock said lever at any desired adjustment. Said lever is connected by a link 46 to the upper end of the arm 20 of the crank-shaft 16, and it will be understood that by turning said lever 43 the crank-axle may be partly turned, so as to raise or lower the rear end of the scraper as may be desired. It will be also understood that the rear supporting-wheels, together with their crank-axles, serve to support the rear portion of the scraper when said supporting-wheels are depressed to the required extent by the adjustment of the crank-axle. Hence the scraper may be caused to bear to any desired extent on the supporting-wheels with which it is provided to regulate the cut of the machine and adapt it to the conditions of the road on which it is in use, and when it is being moved from place to place without being at work said scraper may be entirely raised, so as to cause all of its weight to be borne by the said supporting-wheels, thus greatly facilitating the transportation of the machine from one point to another. It will be further understood that the front truck, which is adapted to be turned angularly, serves to guide the machine in any direction. Since the draft-irons are attached directly to the side bars of the scraper and are totally disconnected from the front truck, the latter is entirely relieved of draft stress.

The spring connections hereinbefore described between the front truck and the scraper, together with the vertically-movable footboard, which forms an element of said connections, greatly facilitate the operation of the machine and give it a yieldable vertical motion, which to a considerable extent lightens the draft thereof.

It will be observed by reference to the drawings that the rear supporting-wheels incline in opposite directions, so that the said rear supporting-wheels operate to prevent lateral movement of the machine when at work. The wheels of the front truck are provided with peripheral annular flanges 48, as shown, which cut into the soil and serve to prevent lateral movement of the front portion of the machine.

On the footboard is mounted a seat 49 of suitable construction.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A road-leveler comprising rearwardly-converging side bars spaced apart at their rear ends and provided with scraper-blades, and a leveling-blade connecting the spaced rear ends of the said side bars of less height than said side bars and secured thereto, substantially as described.

2. A road-leveler comprising in its construction rearwardly-converging side bars, crossbars connecting said side bars, draft devices, scraper-blades secured to the side bars, and a leveling-blade connecting the spaced rear ends of the side bars of less height than said side bars and secured thereto, substantially as described.

3. A road-leveler comprising in its construction rearwardly-converging side bars, crossbars connecting them, draft devices, scraper-blades secured to the side bars, and a curved leveling-blade connecting the spaced rear ends of the side bars of less height than said side bars and secured thereto, substantially as described.

4. A road-leveler comprising in its construction rearwardly-converging side bars, crossbars connecting them, draft devices, scraper-blades secured to the side bars and projecting beyond the rear converging ends thereof, and a leveling-blade attached to the said extending ends of the said scraper-blades bridging the space between the said rear ends of the scraper-blades and being of less height than the said side bars, substantially as described.

5. A road-leveler having rearwardly-converging scraper-blades provided at their front ends with detachable extensions, substantially as described.

6. A road-leveler having rearwardly-converging scraper-blades provided at their front ends with adjustable extensions, substantially as described.

7. A road-leveler having rearwardly-converging scraper-blades provided at their front ends with detachable and adjustable extensions, substantially as described.

8. A road-leveler comprising a scraper provided with supporting-wheels for the rear end thereof, means to raise and lower the rear end of the scraper with respect to the said wheels a frame having its rear end pivotally connected to the rear portion of the scraper for vertical angular movement, a supporting-truck for the front end of said frame, and connections between the latter and the front portion of the scraper to raise and lower the front portion of the scraper, substantially as described.

9. A road-leveler comprising a scraper, a rock-shaft having its bearings on the rear portion of the scraper and provided with cranks and a rock-arm, supporting-wheels for the rear portion of the scraper, carried by the said cranks and vertically movable when the rock-shaft is turned, a frame having its rear end flexibly connected to the rear portion of the scraper, a lever carried by said frame, a connection between said lever and the rock-arm of the rock-shaft to turn the latter, a supporting-truck for the front end of said frame, and connections between the frame and the front portion of the scraper to raise and lower the latter, substantially as described.

10. A road-leveler comprising a scraper provided with supporting-wheels for the rear end thereof, means to raise and lower the rear end of the scraper with respect to the said wheels a frame having its outer end flexibly connected to the rear end of the scraper, a supporting-truck for the front end of the said frame and connections including springs between the frame and the front portion of the scraper, to raise and lower the front portion of the scraper, substantially as described.

In testimony whereof I have hereunto set my hand in presence of two subscribing witnesses.

IRA F. NOBLE.

Witnesses:
H. G. HARRISON,
GUYDA M. LARSEN.